United States Patent Office 3,530,056
Patented Sept. 22, 1970

3,530,056
FLEXIBLE LIQUID JUNCTION
Ihsan A. Haddad, Brighton, Mass., assignor to Ingold Electrodes, Inc., Watertown, Mass., a corporation of Massachusetts
Filed Mar. 21, 1968, Ser. No. 714,920
Int. Cl. G01n 27/30
U.S. Cl. 204—195                    7 Claims

ABSTRACT OF THE DISCLOSURE

A flow control structure for use in a reference or similar type of electrode structure includes a ¾ inch length of heat shrinkable Kynar tubing (initially of 0.045 inch I.D.) in which is positioned a length of 24 gauge fiberglass braided sleeeving and a porous ceramic cylinder 0.032 inch in diameter and 0.125 inch in length. The sleeve is shrunk by application of heat to secure the ceramic plug at one end of the tubing and in contact with the sleeving so that an electrolyte flow path is provided through the tubing. The flow control structure is secured in an opening in the wall of the electrolyte chamber and provides a controlled leak of electrolyte to form a "liquid junction."

SUMMARY OF INVENTION

The invention relates to electrochemical electrode structures and more particularly to a leak structure for a liquid junction in an electrochemical electrode structure such as is used as a reference electrode for ion potential measurements.

In electrochemical measurements two electrodes, a measuring electrode and a reference electrode, are commonly employed in an arrangement whereby the potential difference between the two electrodes is a function of the concentration of a specific ion in the solution of interest. Such an electrochemical electrode structure is used for measuring hydrogen ion concentration, for example. The reference electrode is ordinarily disposed in an electrolyte solution and the measuring electrode is disposed in the sample to be measured. An electrical connection is provided between the electrolyte and the sample by permitting a small flow of electrolyte into the sample through a leak structure to form a "liquid junction."

The structure for forming the liquid junction should in general have the following characteristics: convenient to fabricate; inexpensive both in cost of components and in terms of the required manufacturing support; provide electrolyte flow at a uniform continuous and very low rate; provide the reproducible electric potential needed for accurate measurements; resistant to damage or contamination during use. A particular problem of such leak structures arises where the structure must project a distance beyond the wall of the chamber enclosing the electrolyte as, for example, such leak structures may be easily distorted or broken during use with adverse affect on the accuracy of measurements.

It is an object of this invention to provide an improved liquid junction which can be very easily manufactured and which overcomes difficulties encountered with prior structures.

Another object of the invention is to provide a novel and improved liquid junction structure which is less subject to mechanical damage during use.

Still another object of the invention is the provision of a novel and improved leak structure which permits the minute flow of fluid between zones of different pressures, which leak structure can be made quickly and inexpensively and by the use of only routine skills.

Still another object of the invention is to provide a leak structure including a flexible channel portion.

A further object of the invention is to provide a novel and improved liquid junction structure for use in electrochemical electrode structures which allows greater versatility in the relative positions of the electrode structures.

According to a principal feature of the invention, there is provided a liquid junction structure for an electrochemical electrode that defines a flow path between a reference electrolyte chamber and the material to be measured. This liquid junction comprises an opening in non-conductive wall of the chamber that holds the electrolyte and a flow control structure secured to that opening. This flow control structure includes a flexible electrolyte impervious, non-conductive sheath, a porous element firmly secured at one end of the sheath, and wettable material in the sheath that overlies the porous element and extends to the other end of the sheath. The sheath is appropriately secured to the chamber opening with the porous element outside the chamber so that an electrolyte flow path from the reference electrode chamber to the sample is provided through the sheath, along the wettable material and through the porous plug.

The fluid flow is conducted by the leak structure through a mechanically strong and yet flexible fluid conduit of small size, the flow rate being determined by the characteristics of the porous element. The flexible conduit enables the liquid junction to be located as desired, in remote or inaccessible places for example. The leak structure of the invention is easy to construct and to assemble in an electrode structure and enables uniform and reliable measurements.

Other objects, features and advantages of the invention will be seen as the following description of a particular embodiment progresses, in conjunction with the drawing, in which.

DESCRIPTION OF PARTICULAR EMBODIMENT

Figure 1:
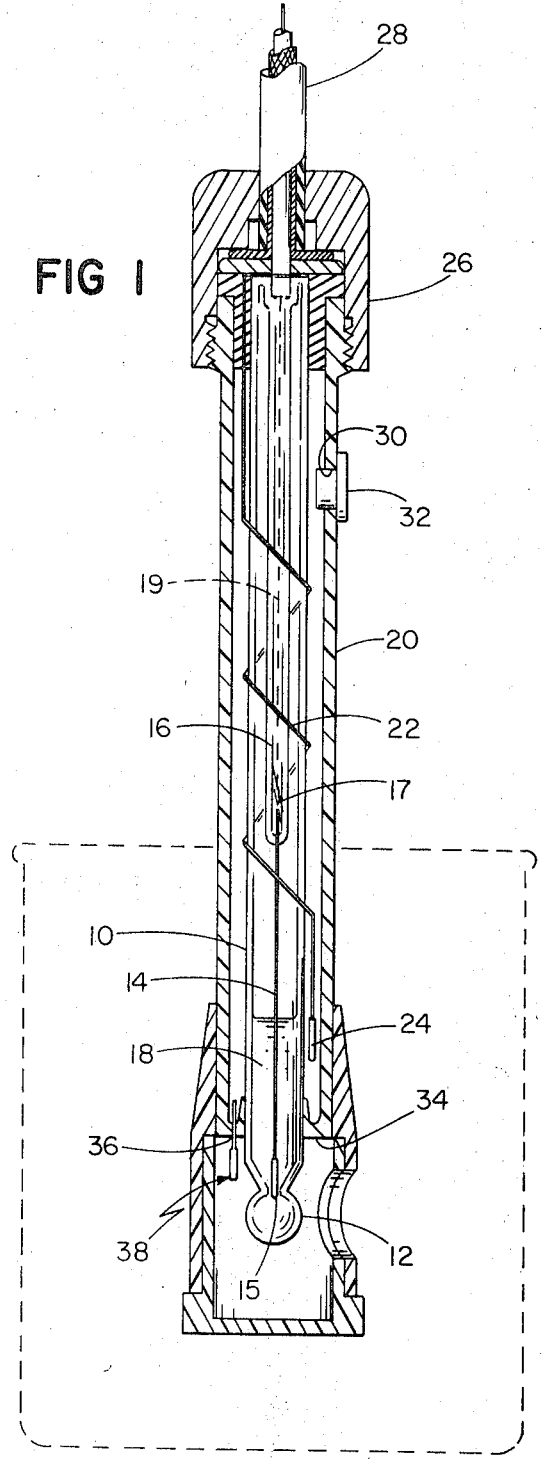
FIG. 1 is a sectional view of an electrochemical electrode assembly employing a leak structure constructed in accordance with the invention.

With reference to FIG. 1 there is shown a combination electrode assembly that includes a tubular glass member 10 which has secured to its base, a bulb 12 of pH sensitive glass. Extending coaxially through member 10 is a silver wire 14 the lower end 15 of which terminates adjacent the bulb 12 and has a silver chloride coating. That silver wire is connected at junction 17 to a platinum support wire 16 that extends upwardly through the center structure 19 of member 10 to its upper end. A suitable electrolyte solution 18 is disposed within member 10 and surrounds the lower portion of the silver wire 14.

Surrounding member 10 is a polyethylene tubular member 20. A silver wire 22 which has a silver chloride coated terminal portion 24 near the base of the chamber formed by member 20 is wound on member 10 in a helix and extends up through rubber plug 26 to an external connection to the shield of coaxial cable 28. An aperture 30 in the wall of tube 20, blocked by stopper 32, is provided to fill the annular space defined between the members 10 and 20 with a suitable electrolyte solution such as potassium chloride. In the base wall 34 of tube 20 an aperture 36 is provided in which is disposed leak structure 38.

Figure 2:
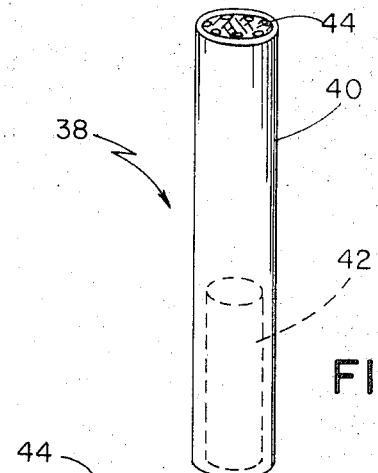
FIG. 2 is a diagrammatic view showing the leak structure in an initial stage of manufacture.
Figure 3:
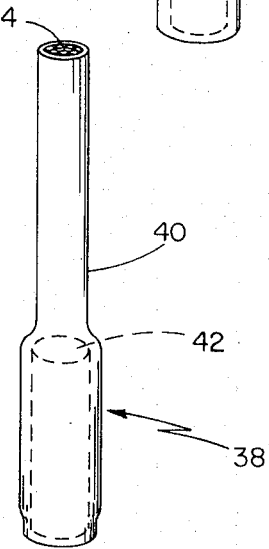
FIG. 3 is a diagrammatic view showing the leak structure in a subsequent stage of manufacture.
Figure 4:
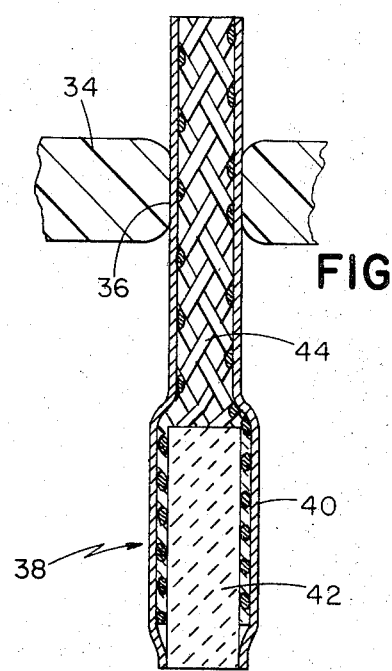
FIG. 4 is an enlarged sectional view of the leak structure employed in the electrode assembly shown in FIG. 1.

Details of this leak structure may be seen with reference to FIGS. 2–4. As indicated in those figures, the leak structure 38 includes a flexible electrically insulating sheath 40, within which is disposed at one end an electrically insulating porous plug 42 and wettable wicking 44 which extends from the plug to the other end of the sheath.

In this particular embodiment, sheath 40 is a length of Kynar (vinylidene fluoride) tubing 1/16 inch O.D. and 0.045 inch I.D. as supplied. When this tubing is subjected to a temperature in excess of 175° C. it will shrink to 50% of its original inner diameter. The porous plug 42 is a ceramic cylinder 0.032 inch in diameter and 1/8 inch in length. The wick 44 is a length of 24 gauge fiberglass braided sleeving. The sleeving 44 is inserted within the sheath 40 and the plug 42 is inserted within sleeving 44. Where desirable to insure that the fluid flow is entirely through the porous plug 42, the sleeving 44 may terminate just before the end of the plug into sleeving as indicated in FIGS. 3 and 4. The sheath 40 is shrunk by heating it, so that the plug 42 is firmly secured within the sheath 40 and the wicking 44 is likewise secured between the plug 42 and the sheath 40 and defines a flow path from the upper end of the sheath. (Where a number of leak structures are to be manufactured, a long length of sleeving 44 may be inserted in a correspondingly long length of sheath 40 and ceramic plugs 42 inserted at intervals one and one half inch apart. After the sheath is shrunk to the configuration generally indicated in FIG. 3 the assembly is cut at three quarter inch intervals, halfway between the plugs 42 and through the plugs themselves to produce junction units generally as indicated in FIG. 3.)

The aperture 36 in the base of member 20 is 0.030 inch in diameter. A stainless steel tube having an O.D. of 0.050 inch and an I.D. of 0.040 inch is inserted in the hole to expand it and then the assembled junction structure is inserted into the stainless steel tubing and positioned through the plane of base wall 34. The steel tube is then withdrawn and the resilience of the polyethylene material of member 20 causes the outer wall of the sheath to be firmly engaged and provides a liquid tight seal at that point.

The electrolyte in the electrode assembly flows at a very small but uniform rate along the wettable wicking 44 in the channel defined by sheath 40 and through the porous plug 42 to the sample in which the pH sensitive portion 12 of the measuring electrode is immersed or in contact. This leak structure provides a compact and mechanically rugged flow path external to the electrolyte chamber through which electrolyte may flow to establish and maintain the desired electrical circuit for referencing the electrical potential of the sample.

It will be obvious to those skilled in the art that a variety of other materials may be used in practicing the invention. For example, the sheath of the leak structure may be of other tubing materials such as Teflon, polyvinylchloride or rubber. Similarly, other materials may be used for the wick and flow control components of the leak structure. If the material of the electrolyte chamber is not resilient, for example, glass, a tubular projection may be formed and the sheath slid over that projection and then secured in position by shrinking. Silicone wax or similar material may be used to supplement the integrity of the seal between the sheath and the chamber wall.

The length of this flexible leak structure may be relatively short or it may be somewhat longer, for example, for use with a remote reference electrode. The leak structure may also be advantageously utilized in chemical reaction studies where the geometric configuration of the pH electrode is critical. Also, a longer length of flexible channel structure enables the porous flow control element to be located where desired, for example, in contact with a surface where a measurement of the characteristic of the surface is to be made.

Therefore, while a particular embodiment of the invention has been shown and described, it is recognized that various modifications thereof will be apparent to those skilled in the art, and it is not intended that the invention be limited to the disclosed embodiment or to details thereof and departures may be made therefrom within the spirit and scope of the invention as defined in the claims.

What is claimed is:

1. In an electrochemical electrode structure, a leak structure comprising a chamber of electrically non-conductive material adapted to contain an electrode and electrolyte, said chamber having an opening therein, and a flow control structure secured to said opening,
   said flow control structure comprising a flexible sleeve of electrolyte impermeable, electrically non-conductive material, said sleeve having one end secured to said opening, and the other end external of said chamber for exposure to the sample material to be analyzed by the electrode structure, a porous member in said sleeve adjacent the other end thereof, and flexible wettable wick material extending through said sleeve from a position overlying the sides of said porous member to said opening for providing an electrolyte flow path from said chamber through said sleeve.

2. The leak structure as claimed in claim 1 wherein said sleeve is of shrinkable material.

3. The leak structure as claimed in claim 2 wherein said sleeve material is a heat shrinkable plastic tubing.

4. The leak structure is claimed in claim 1 wherein said porous member is a ceramic plug.

5. The leak structure as claimed in claim 1 wherein said electrolyte flow path is of capillary dimension.

6. The method of making a leak structure for a liquid junction of an electrochemical electrode comprising the steps of:
   providing a wall of electrically non-conducting material having an opening therein,
   providing a length of shrinkable tubing, inserting elongated wick material and a porous member in said tubing, shrinking said tubing over said wick material and said porous member at one end thereof, and securing the other end of said shrinkable tubing to said opening in said wall.

7. In an electrochemical electrode structure, a leak structure comprising a chamber of electrically non-conductive material adapted to contain an electrode and electrolyte, said chamber having an opening therein, and a flow control structure secured to said opening,
   said flow control structure comprising a sleeve of electrolyte impermeable, electrically non-conductive material, said sleeve having one end secured to said opening, and the other end external of said chamber for exposure to the sample material to be analyzed by the electrode structure, a porous member in said sleeve adjacent the other end thereof, and a braided sheath of wettable, fiber wicking material extending through said sleeve from a position overlying the sides of said porous member to said opening for providing an electrolyte flow path from said chamber through said sleeve.

References Cited

UNITED STATES PATENTS

| 1,944,738 | 1/1934 | Grebe et al. | 204—195 |
| 3,000,804 | 9/1961 | Cahoon et al. | 204—195 |
| 3,049,118 | 8/1962 | Arthur et al. | 204—195.1 |

FOREIGN PATENTS

| 678,648 | 9/1952 | Great Britain. |
| 729,575 | 5/1955 | Great Britain. |

T. TUNG, Primary Examiner

U.S. Cl. X.R.

264—342